United States Patent
Wu

(10) Patent No.: US 7,312,887 B2
(45) Date of Patent: Dec. 25, 2007

(54) INTERNET PRINT PROTOCOL PRINT DISPATCH SERVER

(75) Inventor: Vincent Wu, Irvine, CA (US)

(73) Assignees: Toshiba Corporation (JP); Toshiba Tec Kabushiki Kaisha (JP)

( * ) Notice: Subject to any disclaimer, the term of this patent is extended or adjusted under 35 U.S.C. 154(b) by 997 days.

(21) Appl. No.: 10/393,184

(22) Filed: Mar. 20, 2003

(65) Prior Publication Data
US 2004/0130746 A1 Jul. 8, 2004

Related U.S. Application Data

(63) Continuation-in-part of application No. 10/336,211, filed on Jan. 3, 2003.

(51) Int. Cl.
*G06K 15/00* (2006.01)
*H04M 11/00* (2006.01)

(52) U.S. Cl. .................. 358/1.15; 379/100.01; 379/100.13

(58) Field of Classification Search ............... 358/1.15, 358/1.9, 3.23; 379/93.08, 93.25, 93.31, 100.01, 379/100.13
See application file for complete search history.

(56) References Cited

U.S. PATENT DOCUMENTS

| | | | |
|---|---|---|---|
| 6,327,045 B1 | 12/2001 | Teng et al. | |
| 6,431,772 B1 | 8/2002 | Melo et al. | |
| 2002/0065873 A1 | 5/2002 | Ishizuka | |
| 2002/0078160 A1 | 6/2002 | Kemp et al. | |
| 2002/0080391 A1 | 6/2002 | Sugiura et al. | |
| 2002/0093681 A1 | 7/2002 | Hitaka | |
| 2002/0097424 A1 | 7/2002 | Ferlitsch | |
| 2002/0138558 A1 | 9/2002 | Ferlitsch | |
| 2002/0138564 A1* | 9/2002 | Treptow et al. | ............. 709/203 |
| 2002/0140971 A1 | 10/2002 | Machida | |
| 2002/0169002 A1* | 11/2002 | Imbrie et al. | ............... 455/557 |
| 2002/0184342 A1 | 12/2002 | Kennedy et al. | |

* cited by examiner

*Primary Examiner*—Jerome Grant, II
(74) *Attorney, Agent, or Firm*—Tucker Ellis & West LLP

(57) ABSTRACT

A method for an online Web Server to process print requests for a remote printing. The request is sent by a client using the Internet Printing Protocol to the Server. The server then parses the request and determines the destination for the print job. The print job is then routed to the destination. If the destination printer does not support the Internet Printing Protocol, then the Server converts the print job to a format compatible with the destination printer and sends the job to the printer.

18 Claims, 8 Drawing Sheets

INTERNET PRINT PROTOCOL PRINT DISPATCH SERVER

CROSS-REFERENCE TO RELATED APPLICATIONS

This application is a continuation-in-part of application Ser. No. 10/336,211 filed Jan. 3, 2003.

COPYRIGHT OR MASK WORK NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND OF THE INVENTION

The present invention relates generally to printing systems, and more particularly to a universal printing system that facilitates printing to a remote printer via a print server.

Users of mobile devices such as Personal Digital Assistants (PDAs), laptops or portable personal computers, two way pagers, mobile phones, and other mobile devices can often access information over the internet. However, to print this information, the users of these devices usually need to either have a printer physically connected to the device, or the user must pre-store the document on an internet based storage that can only be accessed by special types of print devices for printing.

Another problem with mobile devices is that many documents must be printed using print drivers or the software used to create the document. Some documents may contain multiple document formats, for example a word processing document containing a graphic document. The mobile device may not have the document's native software for all of the document's formats. As mobile devices often have limited storage capabilities, it is often not feasible to install all of the necessary software programs to handle all of the formats.

Because the device is mobile, a user may desire to print to the nearest printer, and the mobile device may not have a printer driver for the nearest printer installed. Most printers require that a document be converted to a print file containing printer control codes or commands. Thus for a mobile device to be able to print to any printer, it would have to have printer drivers for all known printers installed on it, which due to limited storage capabilities may degrade the usefulness of the device.

One solution to the aforementioned problems is a universal printing system that can enables a portable device, or any client, to select a printer and send a document to that printer via a server without having the native applications for the document or print drivers for the printer. However, this solutions requires the user to log into the server and upload the document to the server. Sometimes a user may prefer to utilize personal preferences such as print finish settings. If the user has a printer driver installed on the client computer, then the user can print the job using the Internet Print Protocol to print to the universal server.

The Internet Printing Protocol (IPP 1.0), described in Internet Printing Protocol/1.1: Model and Semantics and Internet Printing Protocol/1.1: Encoding and Transport, published by the Printer Working Group of the Internet Engineering Task Force (IETF) allows an end user to remotely print to any Internet Print Protocol-enabled print through a communication network. The advantage of using the Internet Printing Protocol is that it provides the opportunity to transmit digital document print jobs anywhere in the world to printers coupled to the Internet without the long distance charges that a facsimile transmission can incur.

The Internet printing protocol may be bi-directional, allowing for communication between the printer and the client process transmitting print jobs to the printer. For example, the user can issue print jobs, inquire about a printer's capabilities, inquire about the status of a printer and the status of a print job, as well as remotely issue other printing commands such as canceling a print job.

However, to print to a remote printer via the Internet Printing Protocol, the printer must have an assigned URL address so that properly formatted print jobs may be sent directly to the printer's address and printed at the remote printer. Therefore, print jobs cannot be submitted to printers that do not have an assigned URL address using the Internet Printing Protocol.

Another problem often encountered when using the Internet Printing Protocol is that not every printer vendor has bi-directional Internet Printing Protocol. Therefore, users are unable to monitor the status of their submitted print jobs.

Thus, a need exists for a method to print using the Internet Printing Protocol to a server which can then appropriately route the print job to any printer regardless of whether it supports the Internet Printing Protocol. There is also a need for a method to retrieve printer job status from printers that do not support bi-directional Internet Printing Protocol.

BRIEF SUMMARY OF THE INVENTION

In view of the aforementioned needs, the invention contemplates an Online Web Print Server with Internet Printing Protocol capabilities. The Online Web Print Server enables a client to select a printer and upload a file to the server. The client does not need to have a printer driver installed for the selected printer because the Online Web Print Server handles all the conversions necessary to produce the output. With the present invention, the client only needs an Internet Printing Protocol (IPP) driver. The client then prints the file using the Internet Printing Protocol Driver and the Server receives, processes and routes the file accordingly.

One aspect of the present invention is for a method for processing data from a client, the steps comprising receiving an internet printing protocol data stream from the client, parsing the data stream for determining a destination device, and routing the data stream to the destination device. Typically the destination device would be a remote printer. If the destination printer is not Internet Printing Protocol complaint, then the data stream is converted to a format compatible with the destination device. A web page may also be updated with the destination device's current status.

Another aspect of the present invention is for a method for processing a print job from a client, the steps comprising receiving the print job via an internet printing protocol from the client, parsing the print job, the parsing step further comprising determining a remote destination printer, and a user identification, and routing the print job to the remote destination printer. The method may further comprise storing job tracking and accounting information, which may also be stored with user identification.

Yet another aspect of the present invention is a method for processing a request for a destination device's status from a client, the steps comprising receiving the request from the client via an internet printing protocol, parsing the request and obtaining an identity for the destination device, routing the request to the destination device, receiving a reply from the destination device, and sending the reply via an internet printing protocol to the client.

If necessary, the formatting step will convert the request to a format compatible with the destination device and the routing step will route converted request to the destination device. Then the response received will be converted from the destination device's format to the internet printing protocol and sent to the client.

Still yet another aspect of the present invention is a method for processing a request for a remote printer status from a client, the steps comprising receiving the request from the client via an internet printing protocol, parsing the request, the parsing step further comprising determining an identity for the remote printer and formatting the request in a format compatible with the remote printer, routing the request in the format compatible with the remote printer to the remote printer, receiving a reply from the remote printer, converting the reply from the format compatible with the destination device to the internet printing protocol, and sending the reply via an internet printing protocol to the client.

The present invention enables an Internet Printing Protocol enabled client to submit a print job to a non-Internet Printing Protocol printer by routing the job through the server. For example, with the present invention a client can use the Internet Printing Protocol to send a print job to a remote printer which only supports Line Printer DAEMON (LPD). The present invention also enables a client to obtain job print status for printers that do not support bi-directional Internet Printing Protocol. By routing the Internet Printing Protocol through the Online Web Printer server, the Online Web Print Server can retrieve job status via an Extensible Markup Language (XML), Simple Network Management Protocol (SNMP), or other appropriate query and respond to the client.

Still other objects of the present invention will become readily apparent to those skilled in this art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without from the invention. Accordingly, the drawing and descriptions will be regarded as illustrative in nature and not as restrictive.

BRIEF DESCRIPTION OF THE SEVERAL VIEWS OF THE DRAWING

The accompanying drawings incorporated in and forming a part of the specification, illustrates several aspects of the present invention, and together with the description serve to explain the principles of the invention. In the drawings.

DETAILED DESCRIPTION OF INVENTION

Throughout this description, the preferred embodiment and examples shown should be considered as exemplars, rather than limitations, of the present invention.

The Internet Printing Protocol is a client-server type protocol which should allow the server side to be either a separate print server or a printer with embedded networking capabilities. The focus of this application is optimized for printers, but might be applied to other devices.

An Online Web Print Server can accept document submissions via an Internet and transmit print jobs to various printers. The printers may be dispersed and located at different remote locations. By adding Internet Printing Protocol print dispatch server capability to the Online Web Printer server, a client using only a generic Internet Printing Protocol print driver can print to the Online Web Print Server directly. After the submission of the print job, the print server can dispatch the print job to a remote printer by specifying the Printer Identification, Printer Name or IP address in an Internet Printing Protocol Uniform Resource Locator. For accounting purposes, a user can input a user identification into the Internet Printing Protocol Uniform Resource Locator.

Figure 1:
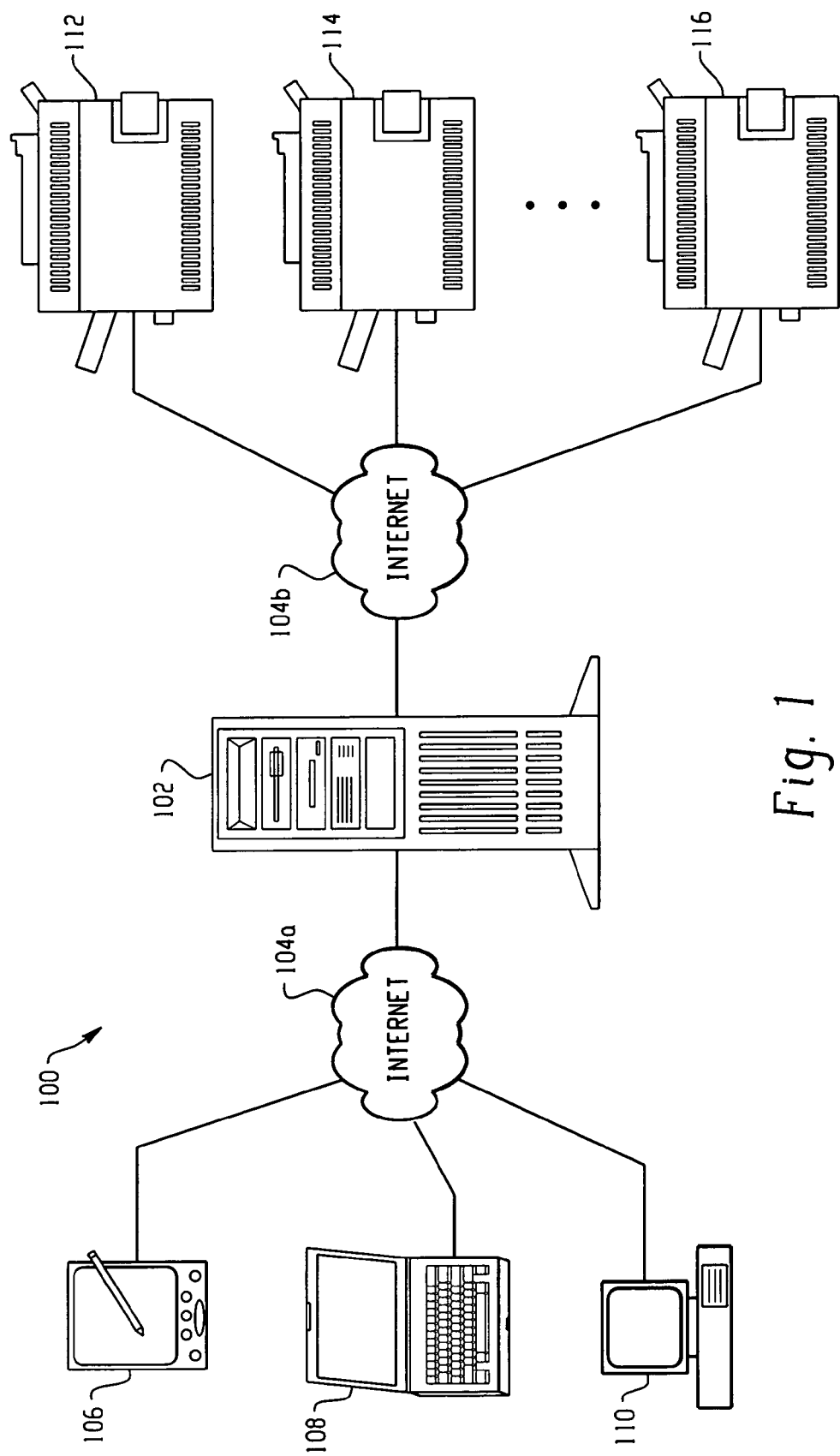
FIG. 1 is a block diagram of the network architecture contemplated by the preferred embodiment of the present invention.

In the preferred embodiment three things are required, an Internet Printing Protocol Uniform Resource Locator (for example http://x.x.x:port_id/scripts), a User Identification (for example UserID=aaa) for charging print charges, and a Printer Identification. The printer name can be viewed from the Online Web Print Server web page, a user may "select printer" from the web page and select the printer from a scrollable list provided by the web page. The printer Identification (for example PrinterID=bbb) is a printer specified by the Online Web Print Server, however, if no printer identification is specified then a default printer is chosen. An example print request follows: http://159.119.123.123:80/scripts/ipps.dll?UserID=12345&PrinterID=LobbyPrinter Referring first to FIG. 1, there is shown an example of a Network Architecture 100 contemplated by the present invention. A web print server 102 is connected over a network 104*a* to clients, the clients comprising a PDA 106, a notebook 108, and a workstation 110. Similarly, network 104*b* connects the web print server 102 to printers, the printers comprising a Black and White Laser Printer 112, a Color Laser Printer 114 and a Color Inkjet Printer 116. In the preferred embodiment, networks 104*a* and 104*b* are the Internet, thus the various clients and printers are not required to be spatially located within close proximity of each other. Furthermore, networks 104*a* and 104*b* may be wired, wireless, or a combination thereof, and networks 104*a* and 104*b* may be the same network (for example the Internet) or separate networks, for example network 104*a* could be the Internet and network 104*b* could be an Intranet.

Figure 2:
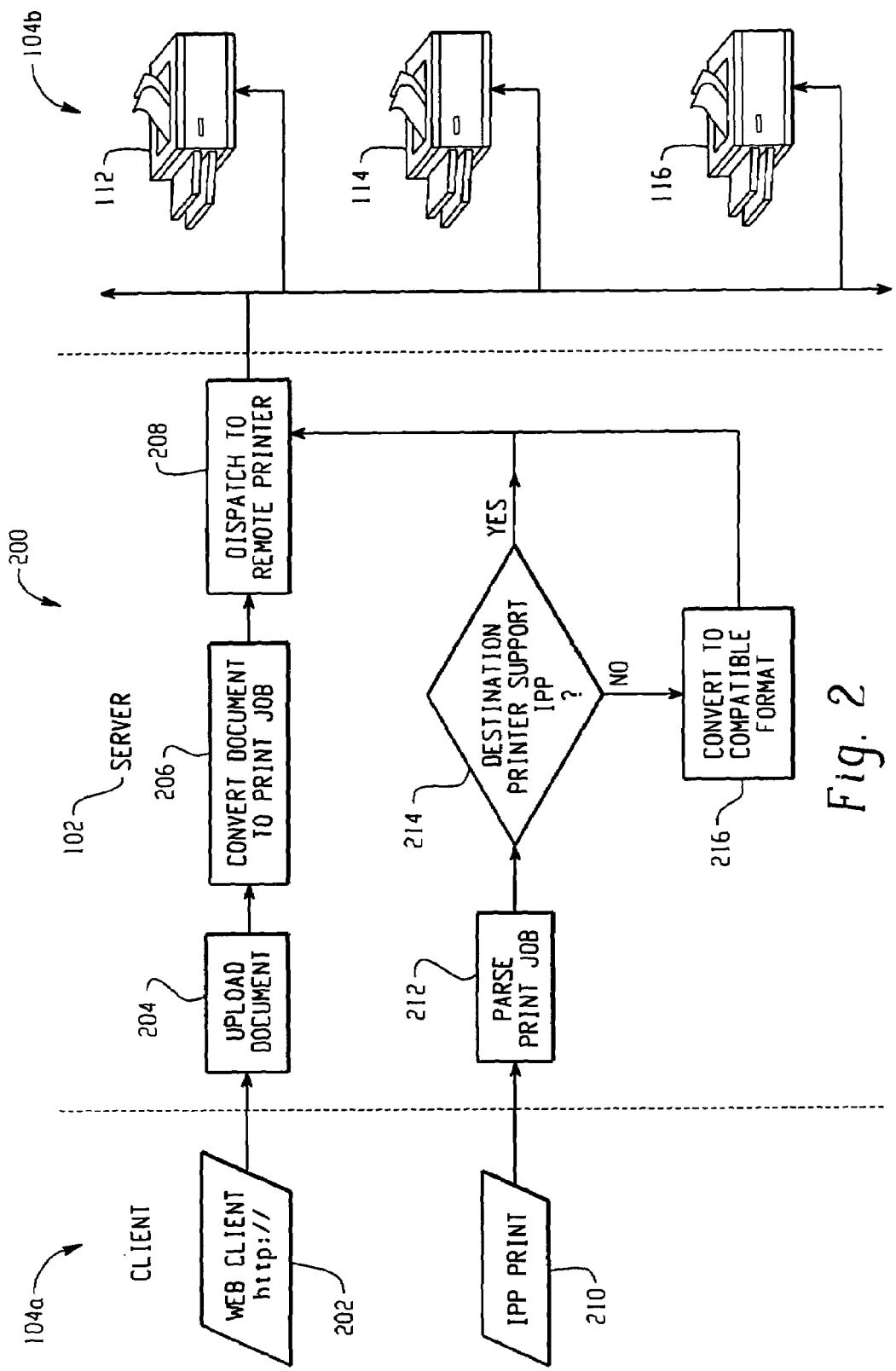
FIG. 2 is a block diagram methods contemplated by the present invention.

Referring now to FIG. 2, there is a block diagram 200 showing the steps of a method contemplated by the present invention. A client, for example either of clients 106, 108 or 110, may send a print job to the Server 102 either via a Web Client interface 202 or the Internet Printing Protocol 210.

If the client uses the web client interface to start the print job as shown in step 202, the document is then uploaded to the server 102 as shown at step 204. At step 206 the server 102 converts the document to a print job which is then dispatched to a remote printer, for example printers 112, 114 and/or 116 via network 104*b* as shown at step 208.

As an alternative, a client, for example either 106, 108, and/or 110, may use an Internet Printing Protocol print driver to send the print job which starts at step 210. At step 212 the server 102 parses the Internet Printing Protocol print job to determine the destination printer, which could be any of printers 112, 114 or 116. At step 214 the server 102 determines whether the destination printer supports Internet Printing Protocol printing. If the destination printer supports Internet Print Protocol printing, then as shown at step 208 the print job is dispatched to the destination printer. If the destination printer does not support IPP printing, then at step 216 the print job is converted to a compatible format for the destination printer before it id dispatched to the destination printer at step 216.

Figure 3:
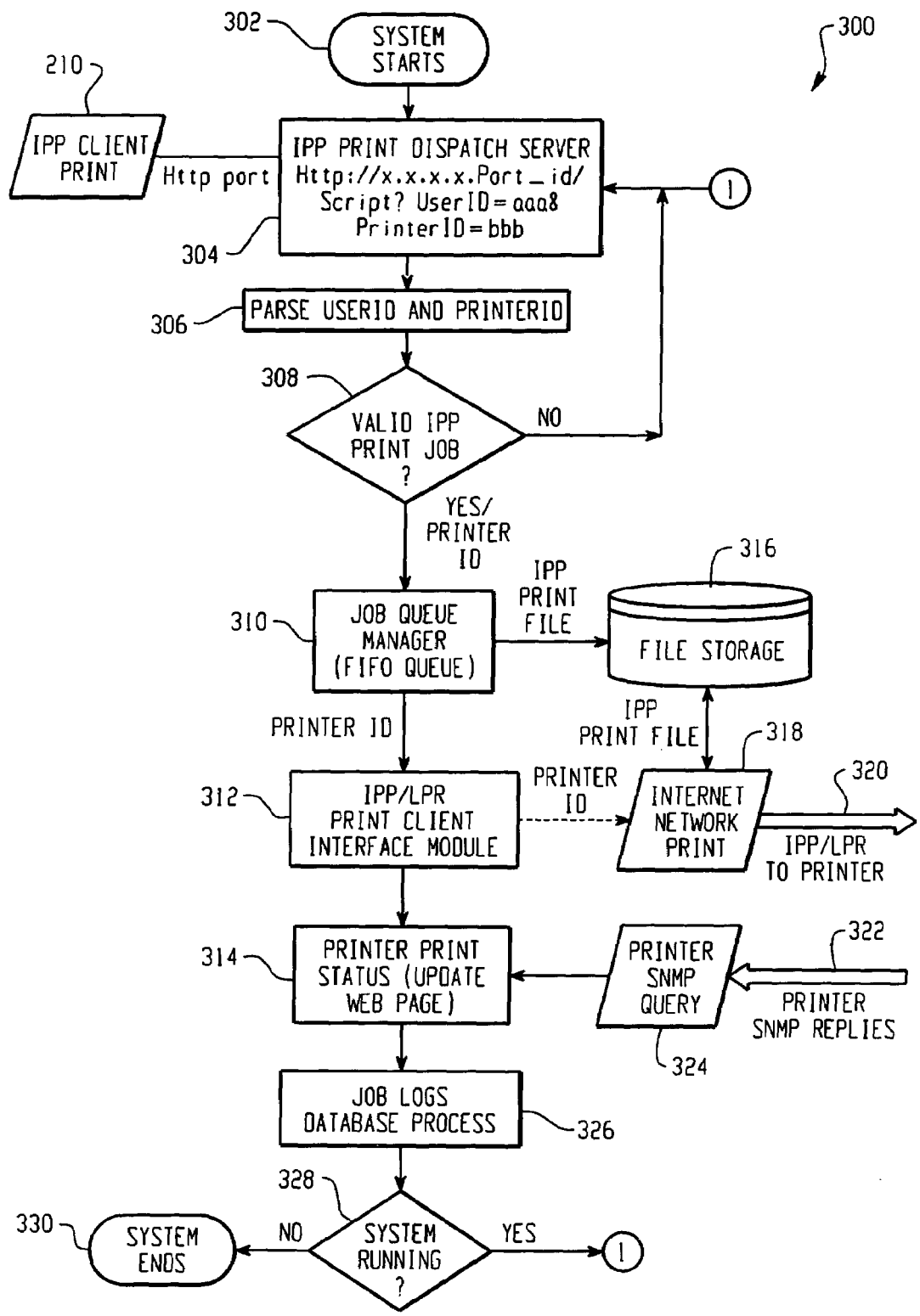
FIG. 3 is a block diagram for a method of printing via the Internet Printing Protocol.

Referring now to FIG. 3, there is illustrated a block diagram showing a method 300 for handling an IPP print job. The system starts at step 302. At step 304 the server receives an IPP print request from the IPP Print Client 210, the request is sent via an HTTP port. An example request is http://x.x.x.x:Port_id/Script?UserID=aaa&PrinterID=bbb, where the "x.x.x.x" is the Internet Protocol address of the server, the UserID=aaa and PrinterID=bbb denote the user requesting the print job and the destination printer respectively. At step 306 the UserID and PrinterID are parsed. At step 308 it is determined if a valid IPP print job was received, if not then the process is aborted and returns to step 304 and the server waits for another print request. At step 310 the print job is passed to the Job Queue Manager, normally a First In First Out (FIFO) queue, however, other types of queues, for example queues that enable a user or administrator to prioritize print jobs are acceptable. An IPP Print file is created and sent to file storage as shown at 316. At step 312 the IPP/LPR Print Client Interface Module receives the PrinterID and send the PrinterID to the internet Network Print Module 318 which then sends the file from the file storage 316 to the destination printer as shown by step 320.

After the print job is submitted to the destination printer, a reply is received from the destination as shown by 322 by the Printer SNMP Query module 324 which then causes a web page to be updated with the Printer Print Status as shown at step 314. As illustrated in 322, the reply is received in SNMP protocol, however, the reply may be received as an IPP or any other print protocol known in the art. After step 314 has been executed, the destination printer's updated status may be viewed using a web browser. At step 326 job logs database processes are handled, such as storing billing information for the print job. At step 326 it is determined if the system is still running, if not then processing ends as shown by step 330. If at step 328 the system is still running then the process returns to step 304 wherein the server waits for the next print job.

Figure 4:
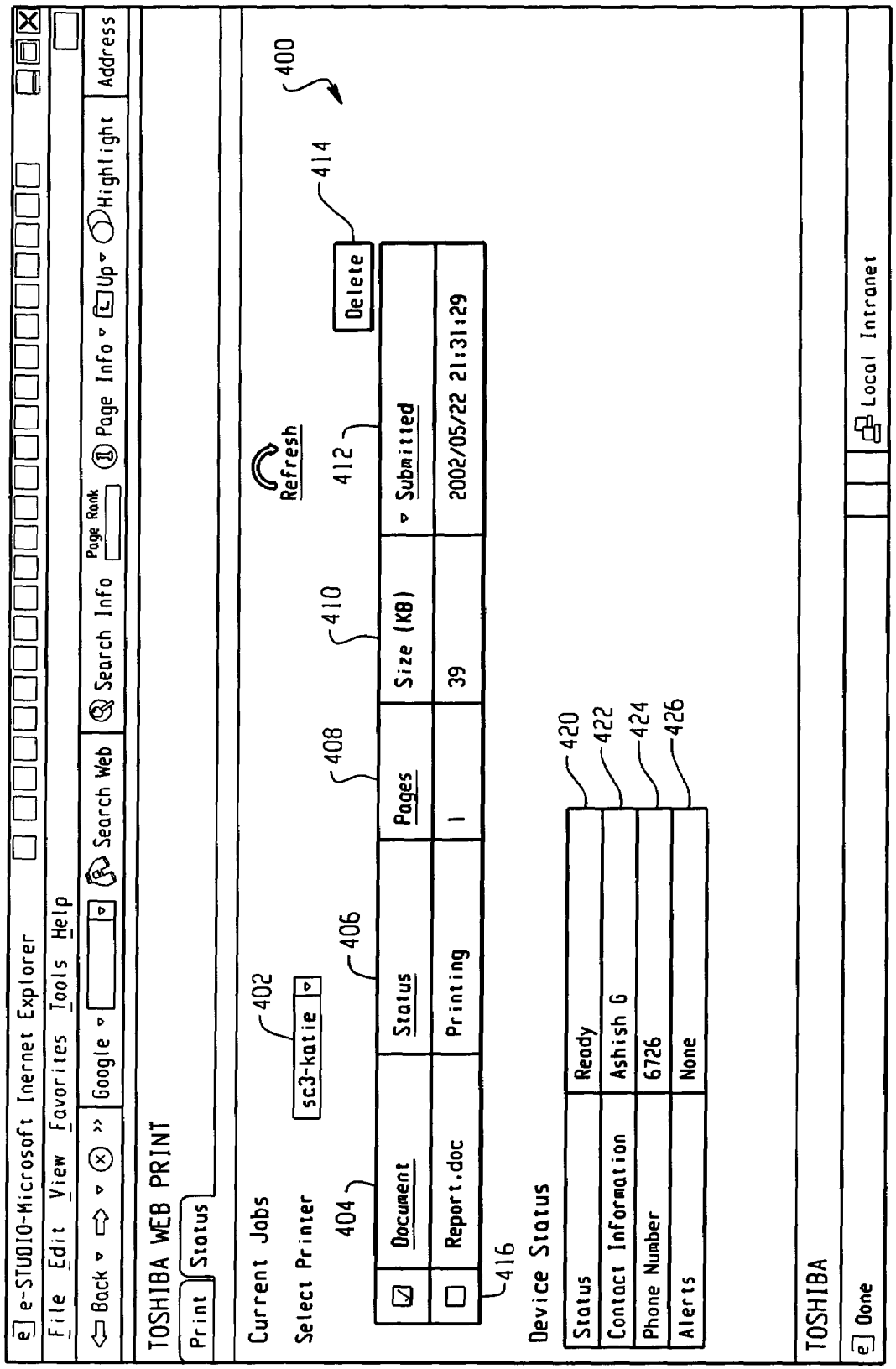
FIG. 4 is an example screen display of a print and device status screen.

Referring now to FIG. 4, there is shown an example of an print and device status screen 400. The print and device status screen as shown has a menu 402 for selecting a printer. The print and device status screen 400 further comprises comprises a table with columns for document name 404, document status 406, number of pages 408, size of job 410 and submitted 412 which denotes when the job was submitted for jobs being processed by the selected printer 402. A checkbox 416 at the beginning of the row describing the print job is used for selecting the print job and can be used in conjunction with delete button 414 to delete the print job if the user has the authority to delete it. The print and device status screen 400 further comprises a table for displaying device status for the selected printer 402 that comprises the printer's status 420, contact information for the printer 422, a phone number for the contact person 424 and alerts 426 for the selected printer 426. As those skilled in the art can readily appreciate, the display may comprise additional device and job status, the aforementioned description is merely descriptive, not limiting.

Figure 5A:
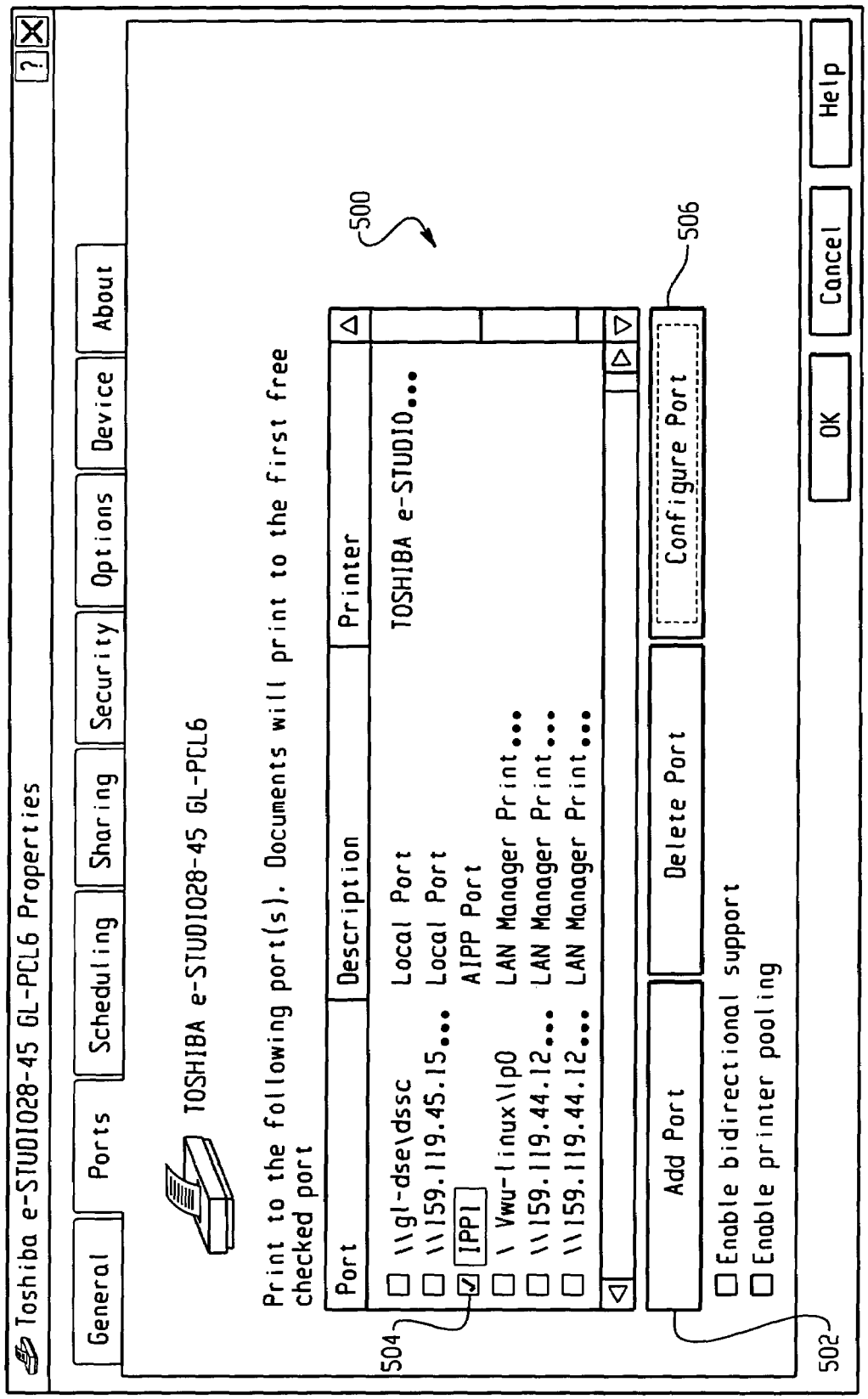
FIG. 5*a* is an example screen display of a printer properties screen.
Figure 5B:
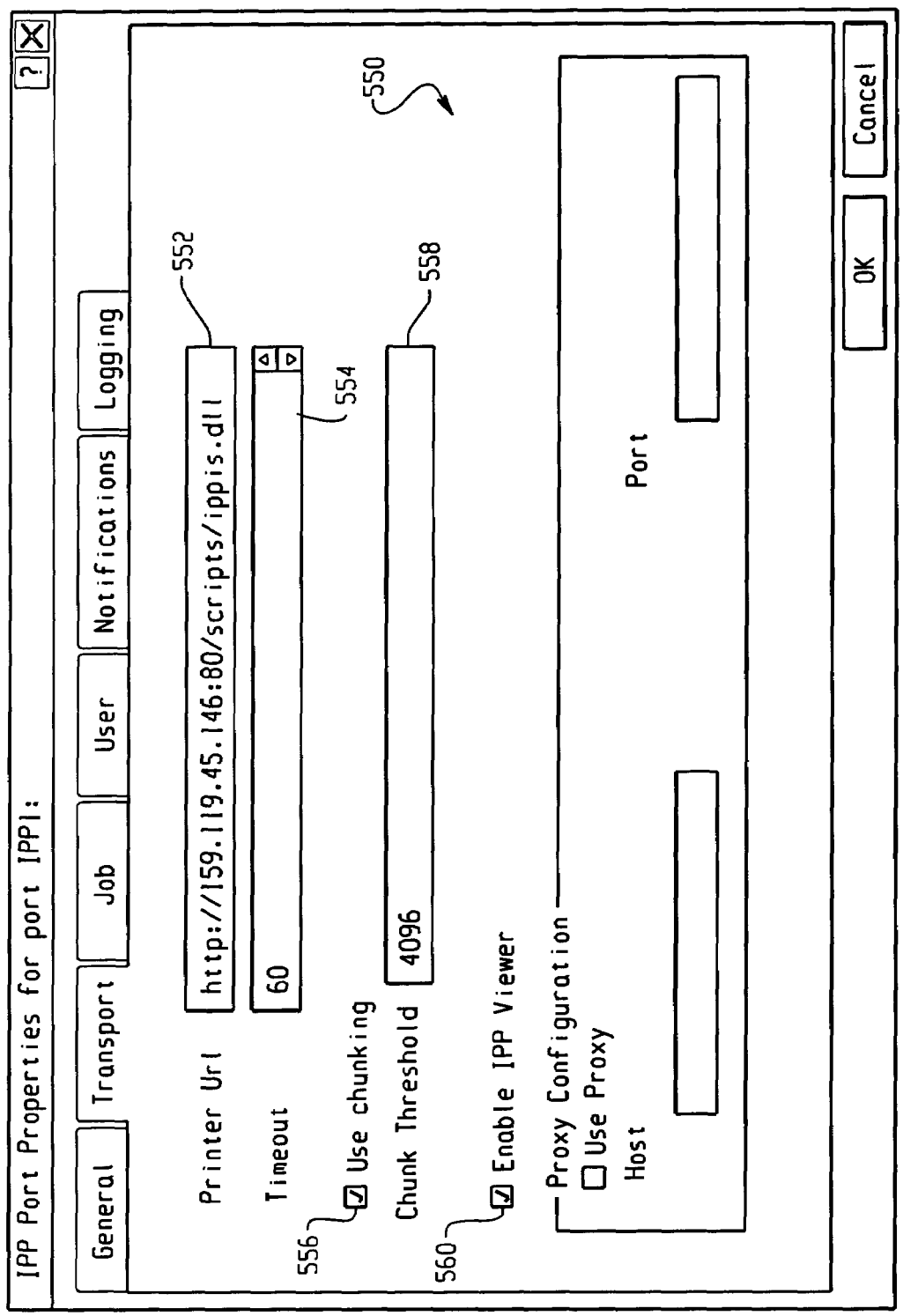
FIG. 5*b* is an example screen display of a configure port screen.

Referring now to FIGS. 5*a* and 5*b*, there is shown example screen shots for configuring client IPP ports for use with the present invention. Software for configuring a client IPP port is readily available from Microsoft Corporation and many other third party vendors. FIG. 5*a* shows an example configuration screen 500 which allows a user to add and delete a port, or configure a port. To add a port the user would click the Add Port button 502. As shown in FIG. 5*a*, by checking the Port 504, the user may then select Configure Port 506 and would receive the IPP Port properties screen 550 shown in FIG. 5*b*. The IPP Port Properties Screen 550 obtains IPP configuration parameters. These parameters include the printer URL 552, Printer Timeout 554, Use Chunking 556 and Chunking Threshold 558 and the Enable IPP Viewer 560.

Figure 6:
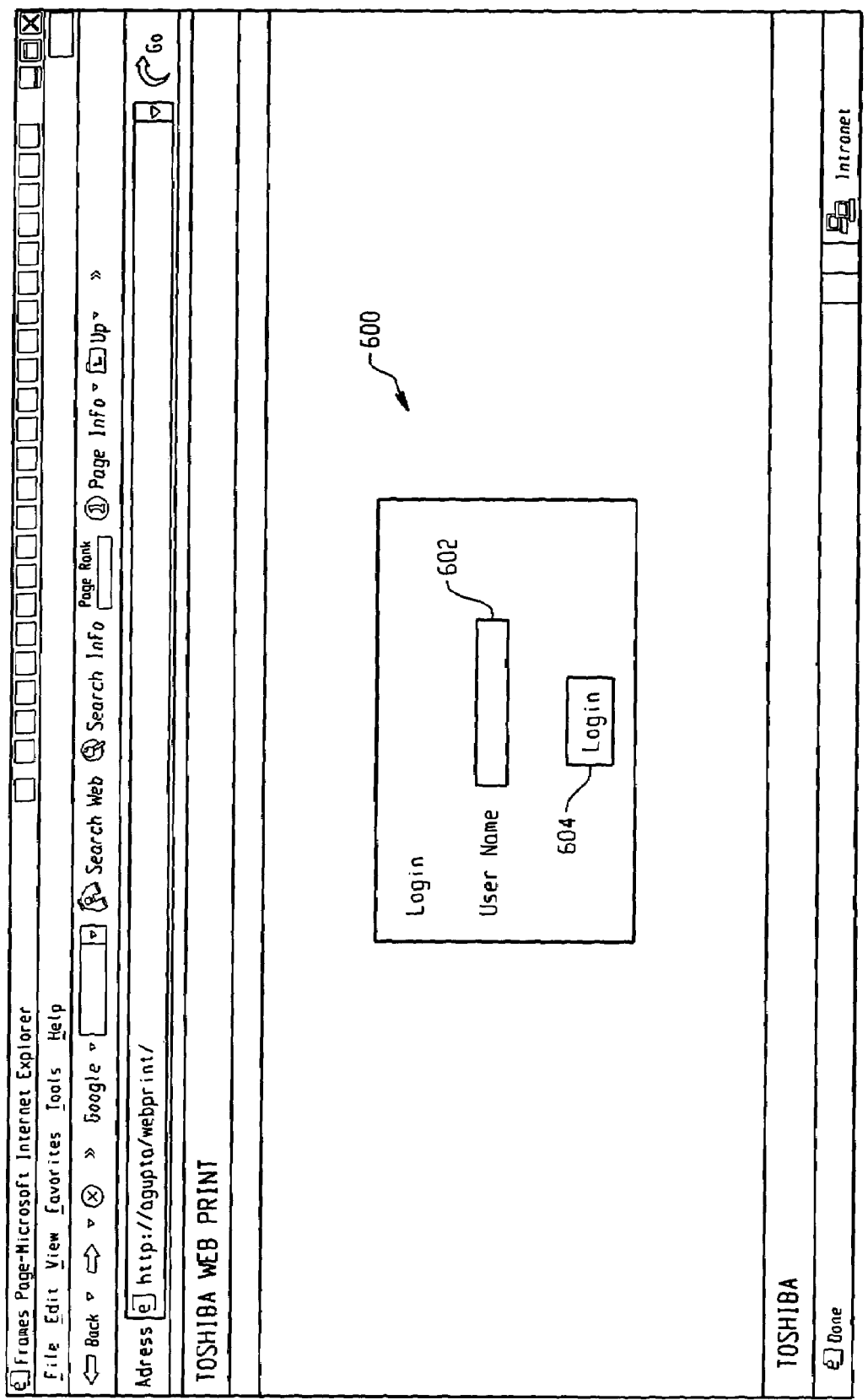
FIG. 6 is an example screen display of a user login screen.

Referring now to FIG. 6, there is shown a user login screen 600 which can be used by a user to log into the server. The user may reach the login screen 600 by entering the URL of the server, for example http://x.x.x.x where x.x.x.x. represents the address of the server. The user would then receive the Print and Device Status Screen 400 of FIG. 4. Alternatively, the user may reach the Print and Device Status Screen 400 of FIG. 4 by entering the URL http://x.x.x.x/default.asp?UserID=aaa&PrinterID=bbb where aaa is the user identification and bbb is the dispatch to printer identification.

Figure 7:
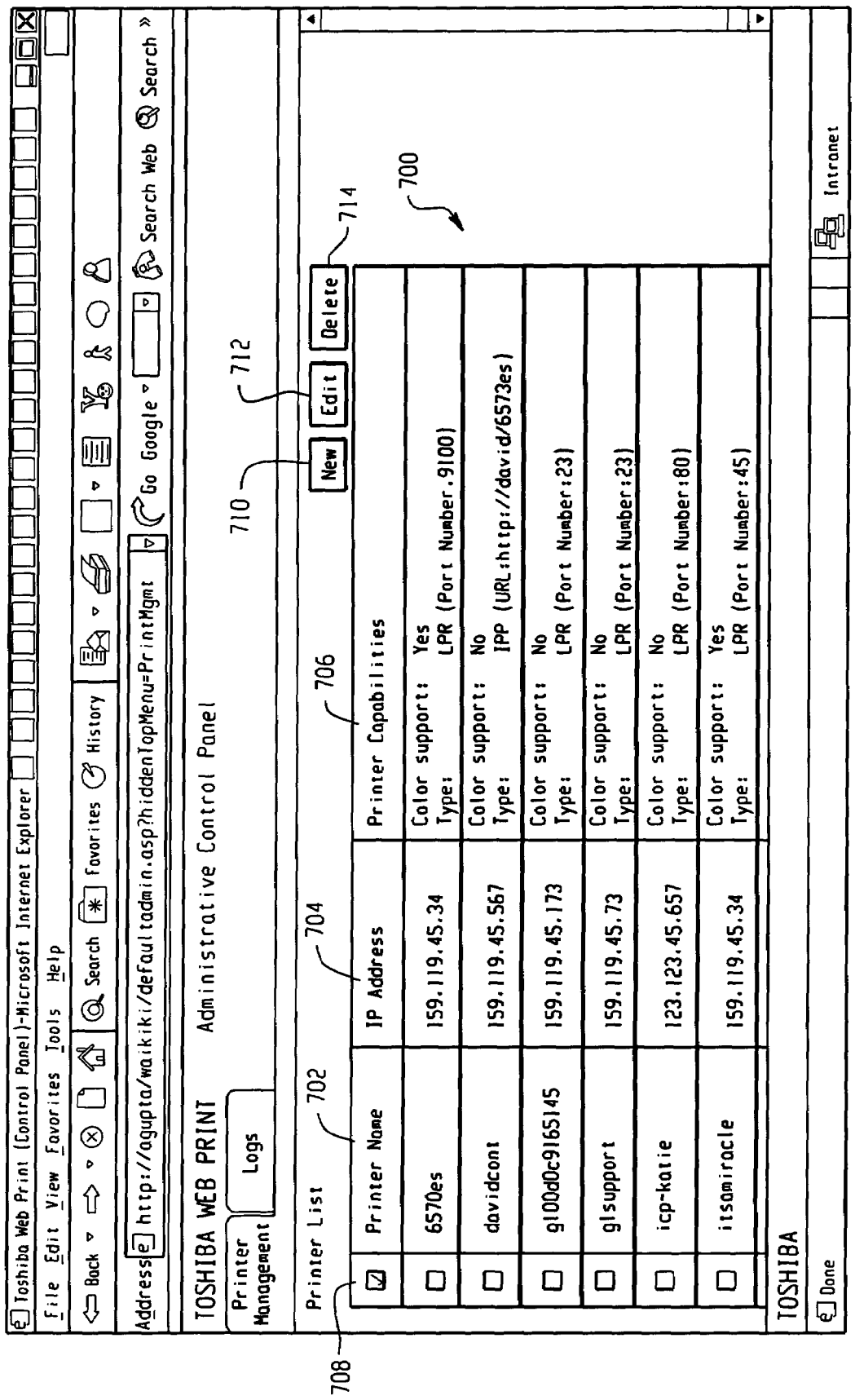
FIG. 7 is an example screen display of an printer management screen.

Referring now to FIG. 7 there is an example of an administrative control panel 700 display. After logging in via the login screen 600 (FIG. 6). The administrative control panel 700 displays a list of printers and enables an administrator to configure printers or view printer logs. The administrative control panel 700 display for each printer comprises a printer name 702, IP address 704, and Printer capabilities 706. The administrator place check a checkbox in the first column 708 to select printers to edit or delete. After selecting a printer, the user would either use the edit pushbutton 712 or the delete pushbutton 714 to edit or delete the selected printer respectively. A new printer may be added by selecting button 710.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of the ordinary skill in the art to utilize the invention in various embodiments and with various modifications as are suited to the particular use contemplated. All such modifications and variations are within the scope of the invention as determined by the appended claims when interpreted in accordance to the breadth to which they are fairly, legally and equitably entitled.

What is claimed is:

1. A method for processing data from a client, the steps comprising:
   receiving an internet printing protocol data stream from a driver associated with the client;
   generating a web client interface on the client, which web client interface includes device data corresponding to a feature of at least one associated document output device;
   receiving, from the web client interface, selection data representative of a selected document processing operation to be associated with a received printing protocol data stream;
   parsing the data stream, the parsing step further comprising obtaining a destination document output device to be associated with the printing protocol data stream;
   converting the printing protocol data stream to a format compatible with the destination document output device; and
   routing the printing protocol data stream to the destination document output device.

2. The method of claim 1 wherein the destination document output device is a remote printer.

3. The method of claim 1 further comprising storing job tracking and accounting information.

4. The method of claim 1, the parsing step further comprises obtaining a user identification.

5. The method of claim 4 further comprising storing job tracking and accounting information with the user identification.

6. The method of claim 1 further comprising updating a web page with the destination document output device's current status.

7. A method for processing a print job from a client, the steps comprising:
   receiving the print job via an internet printing protocol data stream from a driver associated with the client;
   generating a web client interface on the client, which thin client display includes device data corresponding to a feature of at least one associated document output device;
   receiving, from the web client interface, selection data representative of a selected document processing operation to be associated with a received printing protocol data stream;
   parsing the print job, the parsing step further comprising determining a remote destination document output device, and a user identification;
   converting the printing protocol data stream to a format compatible with the remote destination document output device; and
   routing the printing protocol data stream to the remote destination document output device.

8. The method of claim 7 further comprising storing job tracking and accounting information.

9. The method of claim 7 further comprising storing job tracking and accounting information with the user identification.

10. The method of claim 7 further comprising updating a web page with the remote destination printer's current status.

11. A method for processing a request for a destination device's status from a client, the steps comprising:
    receiving the request from a driver associated with the client via an internet printing protocol;
    generating a web client interface on the client, which web client interface includes device data corresponding to a feature of at least one associated document output device;
    receiving, from the web client interface, selection data representative of a selected document processing operation to be associated with the received request;
    parsing the request and determining the destination document output device;
    converting the request to a format compatible with the destination document output device;
    routing the request to the destination document output device;
    receiving a reply from the destination document output device;
    converting the reply from the format compatible with the destination document output device to the internet printing protocol; and
    sending the reply via an internet printing protocol to the client.

12. The method of claim 11 wherein the destination device is a remote printer.

13. A method for processing a request for a remote printer status from a client, the steps comprising:
    receiving the request from a driver associated with the client via an internet printing protocol;
    generating a web client interface on the client, which web client interface includes device data corresponding to a feature of at least one associated document output device;
    receiving, from the web client interface, selection data representative of a selected document processing operation to be associated with the received request;
    parsing the request, the parsing step comprising determining an identity for the remote document output device and formatting the request in a format compatible with the remote printer;
    routing the request in the format compatible with the remote document output device to the remote document output device;
    receiving a reply from the remote document output device;
    converting the reply from the format compatible with the remote document output device to the internet printing protocol; and
    sending the reply via an internet printing protocol to the client.

14. A computer program product stored on a computer readable medium having computer program logic recorded thereon for processing a print job from a client, comprising:
    instructions for—receiving a print job via an internet printing protocol data stream from a driver associated with the client;
    instructions for generating a web client interface on the client, which web client interface includes device data corresponding to a feature of at least one associated document output device;
    instructions for receiving, from the web client interface, selection data representative of a selected document processing operation to be associated with the printing protocol data stream; instructions for parsing the print job, the instructions further comprising instructions for determining a remote destination document output device to be associated with the printing protocol data stream, and a user identification;

instructions for converting the print job to a format compatible with the destination document output device; and instructions for routing the printing protocol data stream to the remote destination document output device.

15. The computer program product of claim 14 further comprising instructions for storing job tracking and accounting information.

16. The computer program product of claim 14 further comprising instructions for storing job tracking and accounting information with the user identification.

17. The computer program product of claim 14 further comprising instructions for updating a web page with the remote destination printer's current status.

18. A computer program product stored on a computer readable medium having computer program logic recorded thereon, comprising:

instructions to receive a request to obtain a remote document out device's status from a client via an internet printing protocol;

instructions to generate a web client interface on the client, which web client interface includes device data corresponding to a feature of at least one associated document output device;

instructions to receive, from the web client interface, selection data representative of a selected document processing operation to be associated with the received request;

instructions to parse the request, the instructions further comprising instructions to obtain an identity for the remote document output device and instructions to format the request in a format compatible with the remote document output device;

instructions to route the request in the format compatible with the remote printer to the remote document output device;

instructions to receive a reply from the remote document output device;

instructions to convert the reply from the format compatible with the remote document output device to the internet printing protocol; and instructions to send the reply via the internet printing protocol to the client.

\* \* \* \* \*